United States Patent
Chien et al.

(10) Patent No.: US 11,983,866 B2
(45) Date of Patent: May 14, 2024

(54) IMAGE DEFECT DETECTION METHOD, ELECTRONIC DEVICE USING THE SAME

(71) Applicant: HON HAI PRECISION INDUSTRY CO., LTD., New Taipei (TW)

(72) Inventors: Shih-Chao Chien, New Taipei (TW); Chin-Pin Kuo, New Taipei (TW); Tung-Tso Tsai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 344 days.

(21) Appl. No.: 17/585,855

(22) Filed: Jan. 27, 2022

(65) Prior Publication Data
US 2022/0253998 A1 Aug. 11, 2022

(30) Foreign Application Priority Data
Feb. 9, 2021 (CN) .......................... 202110183338.5

(51) Int. Cl.
*G06T 7/00* (2017.01)
*G06V 10/774* (2022.01)

(52) U.S. Cl.
CPC ............ *G06T 7/001* (2013.01); *G06V 10/774* (2022.01); *G06T 2207/20076* (2013.01); *G06T 2207/20081* (2013.01)

(58) Field of Classification Search
CPC ........... G06T 7/001; G06T 2207/20076; G06T 2207/20081; G06V 10/774
USPC ........................................................ 382/141
See application file for complete search history.

(56) References Cited

U.S. PATENT DOCUMENTS

| | | | |
|---|---|---|---|
| 11,521,012 B2 * | 12/2022 | Ma | G06N 3/04 |
| 2021/0374928 A1 * | 12/2021 | Hida | G06F 18/2148 |
| 2022/0036533 A1 * | 2/2022 | Xiao | G06N 20/00 |
| 2022/0207707 A1 * | 6/2022 | Yang | G06T 5/00 |
| 2022/0254145 A1 * | 8/2022 | Yang | G06N 3/045 |

\* cited by examiner

*Primary Examiner* — Roy M Punnoose
(74) *Attorney, Agent, or Firm* — ScienBiziP, P.C.

(57) ABSTRACT

An image defect detection method used in an electronic device, calculates a Kullback-Leible divergence between a first probability distribution and a second probability distribution, and thereby obtains a total loss. Images of samples for testing are input into an autoencoder to calculate a second latent features of the testing sample images and the second reconstructed images. Second reconstruction errors are calculated by a preset error function, as is a third probability distribution of the second latent features, and a total error is calculated according to the third probability distribution and the second reconstruction errors. When the total error is greater than or equal to the threshold, determining that the images of samples for testing reveal defects, and when the total error is less than the threshold, determining that the images of samples for testing reveal no defects.

20 Claims, 3 Drawing Sheets

IMAGE DEFECT DETECTION METHOD, ELECTRONIC DEVICE USING THE SAME

CROSS-REFERENCE TO RELATED APPLICATIONS

This application claims priority to Chinese Patent Application No. 202110183338.5 filed on Feb. 9, 2021, the contents of which are incorporated by reference herein.

FIELD

The subject matter herein generally relates to a field of data processing, in particular, to an image defect detection method, and an electronic device.

BACKGROUND

In order to improve the quality of industrial products, a defect detection is executed before the industrial products are packaged. However, current defect detection methods which based on a Gaussian mixture model usually require a huge amount of calculation, a speed of the calculation program may not be optimized.

BRIEF DESCRIPTION OF THE DRAWINGS

Implementations of the present disclosure will now be described, by way of embodiment, with reference to the attached figures.

DETAILED DESCRIPTION

Figure 1:
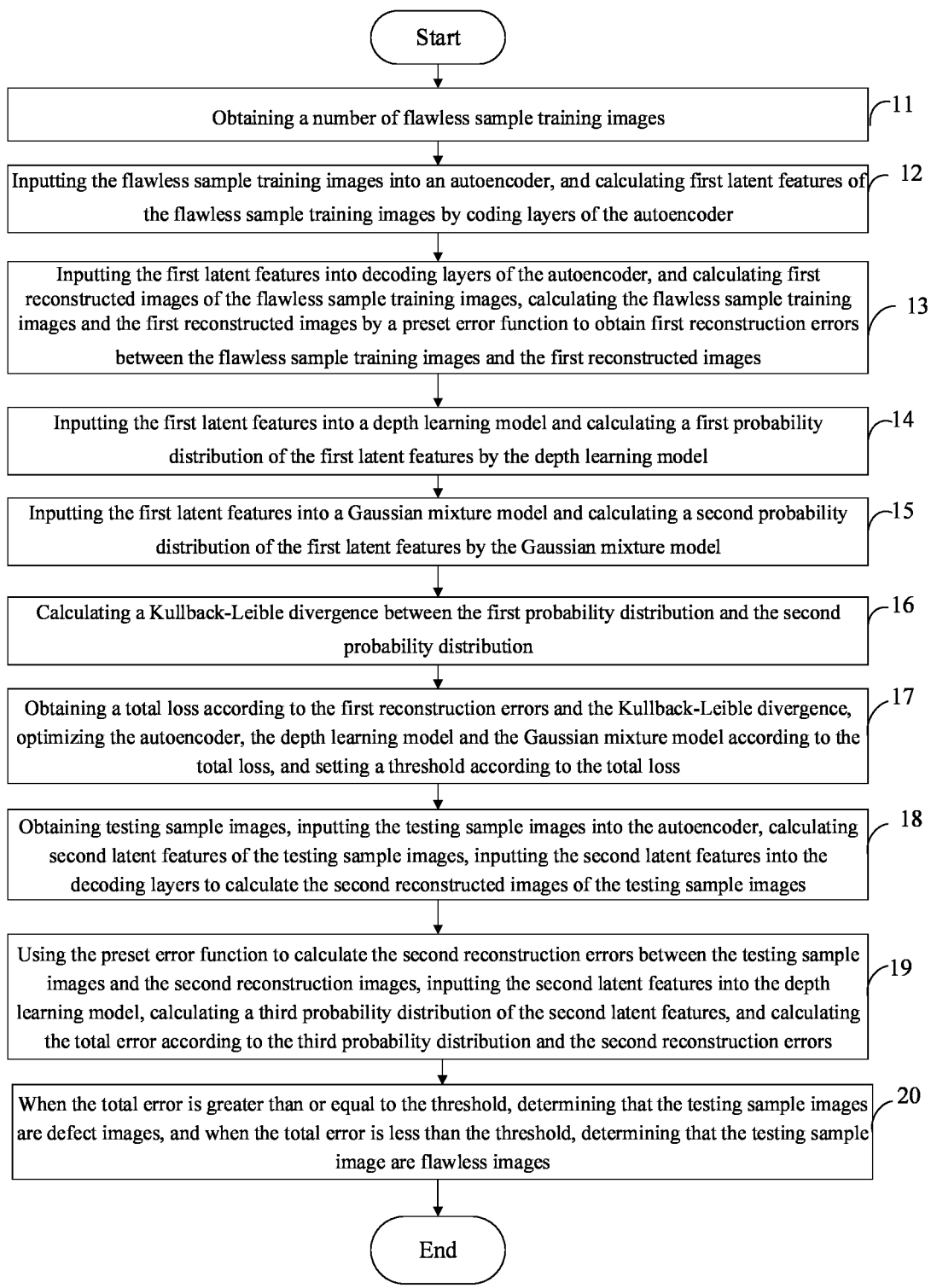
FIG. 1 is a flowchart of one embodiment of an image defect detection method according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

An image defect detection method is illustrated in the disclosure. The method is applied in one or more electronic devices. The electronic device can function according to a number of preset or stored instructions. The hardware of the electronic device includes, but is not limited to, a microprocessor, an Application Specific Integrated Circuit (ASIC), a Field Programmable Gate Array (FPGA), a Digital signal processor (DSP), or an embedded equipment, etc.

In one embodiment, the electronic device can be a desktop computer, a notebook computer, a tablet computer, a cloud server, or other computing device. The device can carry out a human-computer interaction with user by a keyboard, a mouse, a remote controller, a touch pad or a voice control device.

FIG. 1 illustrates the image defect detection method. The method is applied in the electronic device 6 (referring to FIG. 3). The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 11.

At block 11, obtaining a number of images of objects without flaws (flawless sample training images).

At block 12, inputting the flawless sample training images into an autoencoder, and calculating first latent features of the flawless sample training images by coding layers of the autoencoder.

In one embodiment, calculating the first latent features of the flawless sample training images by the coding layer of the autoencoder includes: vectorizing the flawless sample training images to obtain feature vectors of the flawless sample training images, and calculating the feature vectors of the flawless sample training images by the coding layers of the autoencoder to obtain the first latent features.

At block 13, inputting the first latent features into decoding layers of the autoencoder, and calculating first reconstructed images of the flawless sample training images by the decoding layers, and calculating the flawless sample training images and the first reconstructed images by a preset error function to obtain first reconstruction errors between the flawless sample training images and the first reconstructed images.

In one embodiment, the inputting of the first latent features into the decoding layers of the autoencoder and calculating the first reconstructed images of the flawless sample training images by the decoding layers includes: calculating the first latent features by the decoding layers of the autoencoder; restoring the first latent features to obtain the first reconstructed images.

At block 14, inputting the first latent features into a depth learning model and calculating a first probability distribution of the first latent features by the depth learning model.

In one embodiment, the inputting of the first latent features into a depth learning model and calculating a first probability distribution of the first latent features by the depth learning model includes: inputting the first latent features into the deep learning model, calculating the first latent features by one or more of the convolution layers, pooling layers, and hidden layers in the deep learning model, to obtain the first probability distribution.

At block 15, inputting the first latent features into a Gaussian mixture model and calculating a second probability distribution of the first latent features by the Gaussian mixture model.

In one embodiment, the inputting of the first latent features into a Gaussian mixture model and calculating a second probability distribution of the first latent features by the Gaussian mixture model includes: inputting the first latent features into the Gaussian mixture model and fitting the probability distribution of the first latent features by the Gaussian mixture model to obtain the second probability distribution.

In one embodiment, a formula of the Gaussian mixture model is G $(x_i)=\Sigma_{i=1}^{K}\alpha_k N(x_i|\mu_k,\sigma_k)$, where $x_i$ is a vector corresponding to the first latent features, t=1, 2, 3 . . . , M, M is a dimension of the first latent features, $\alpha_k$ is a weight of a kth Gaussian distribution, $\alpha_k$ is a mean value of the kth Gaussian distribution, $\sigma_k$ is variance of the kth Gaussian distributions, $N(x_i|\mu_k,\sigma_k)$ is a normal distribution, and k is an integer of more than three.

At block 16, calculating a Kullback-Leible divergence between the first probability distribution and the second probability distribution.

In one embodiment, calculating the Kullback-Leible divergence between the first probability distribution and the second probability distribution includes: calculating the Kullback-Leible divergence between the first probability distribution and the second probability distribution according to a formula $$D_{KL}(P\|Q) = -\sum_i P(i)\ln\frac{Q(i)}{P(i)},$$

where $D_{KL}(P\|Q)$ is the Kullback-Leible divergence between the first probability distribution and the second probability distribution, P(i) is the second probability distribution, and Q(i) is the first probability distribution.

At block 17, obtaining a total loss according to the first reconstruction errors and the Kullback-Leible divergence, optimizing the autoencoder, the depth learning model and the Gaussian mixture model according to the total loss, and setting a threshold according to the total loss.

In one embodiment, the obtaining of a total loss according to the first reconstruction errors and the Kullback-Leible divergence, and further optimizing the autoencoder, the depth learning model, and the Gaussian mixture model according to the total loss includes: calculating a product between the first reconstruction errors and the Kurbeck Leibler divergence to obtain the total loss, optimizing parameters of the autoencoder, parameters of the deep learning model and parameters of the Gaussian mixture model to minimize the total loss.

In one embodiment, the autoencoder, the deep learning model and the Gauss mixing model are adjusted to minimize the total loss, with the aim of optimizing the auto encoder, the deep learning model, and the Gauss mixed mode, and making the deep learning model have the same probability distribution as the reconstructed image generated by the Gaussian mixture model according to the autoencoder.

At block 18, obtaining testing sample images, inputting the testing sample images into the autoencoder, calculating second latent features of the testing sample images by the coding layers of the autoencoder, and inputting the second latent features into the decoding layers of the autoencoder to calculate the second reconstructed images of the testing sample images.

At block 19, using the preset error function to calculate the second reconstruction errors between the testing sample images and the second reconstruction images, inputting the second latent features into the depth learning model, calculating a third probability distribution of the second latent features, and calculating the total error according to the third probability distribution and the second reconstruction errors.

In one embodiment, the calculation of total error according to the third probability distribution and the second reconstruction errors includes: summing the third probability distribution and the second reconstruction errors to obtain the total error.

At block 20, when the total error is greater than or equal to the threshold, determining that the testing sample images are defect images, and when the total error is less than the threshold, determining that the testing sample image are flawless images.

In present disclosure, by simultaneously training the autoencoder, the deep learning model, and the Gaussian mixture model, the deep learning model and the Gaussian mixture model can output the same probability distribution prediction, so that the deep learning model can replace the Gaussian mixture model to detect the images revealing defects, increasing efficiency in defect detection.

Figure 2:
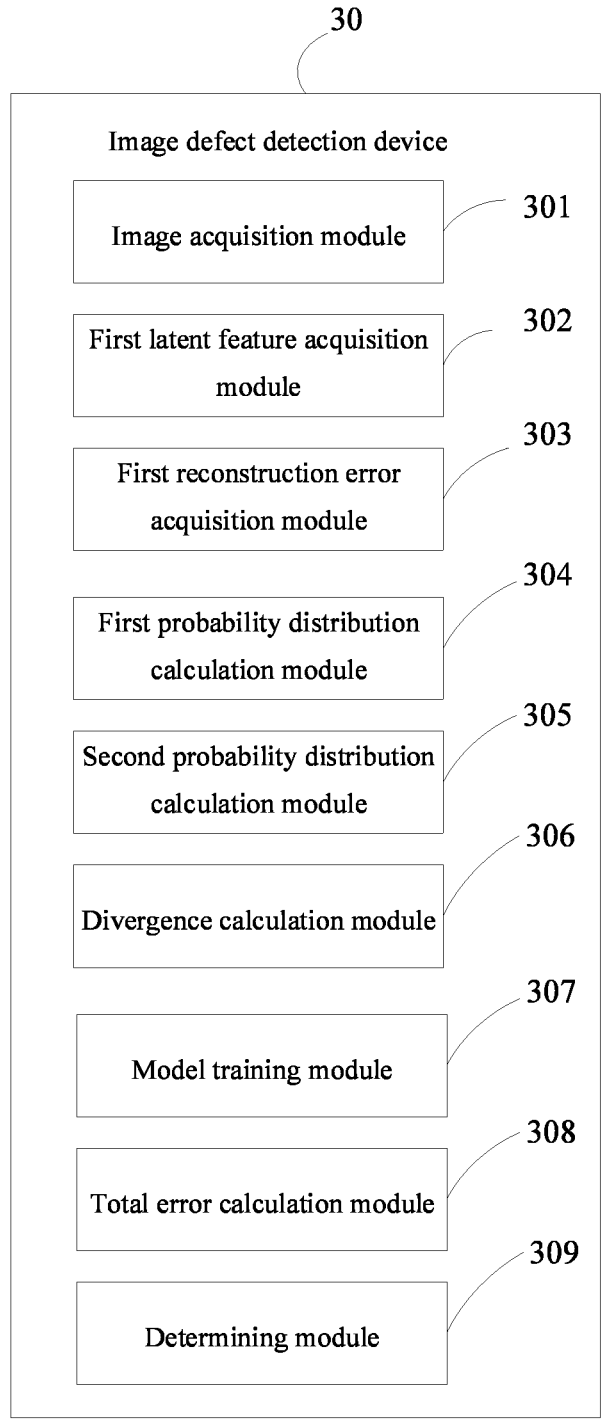
FIG. 2 is a block diagram of one embodiment of an image defect detection device according to the present disclosure.

FIG. 2 illustrates an image defect detection device 30. The image defect detection device 30 is applied in the electronic device 6. In one embodiment, according to the functions it performs, the image defect detection device 30 can be divided into a plurality of functional modules. The functional modules perform the blocks 11-20 in the embodiment of FIG. 1 to perform the functions of image defect detection.

In one embodiment, the image defect detection device 30 includes, but is not limited to, an image acquisition module 301, a first latent feature acquisition module 302, a first reconstruction error acquisition module 303, a first probability distribution calculation module 304, a second probability distribution calculation module 305, a divergence calculation module 306, a model training module 307, a total error calculation module 308, and a determining module 309. The modules 301-309 of the image defect detection device 30 can be collections of software instructions. In one embodiment, the program code of each program segment in the software instructions can be stored in a storage and executed by at least one processor to perform the required functions.

The image acquisition module 301 obtains a number of sample training images which reveal no flaws.

The first latent feature acquisition module 302 inputs the flawless sample training images into an autoencoder, and calculates first latent features of the flawless sample training images by coding layers of the autoencoder.

In one embodiment, the first latent feature acquisition module 302 vectorizes the flawless sample training images to obtain feature vectors of the flawless sample training images, and calculates the feature vectors of the flawless sample training images by the coding layers of the autoencoder to obtain the first latent features.

The first reconstruction error acquisition module 303 inputs the first latent features into decoding layers of the autoencoder, and calculates first reconstructed images of the flawless sample training images by the decoding layers, and calculates the flawless sample training images and the first reconstructed images by a preset error function to obtain first reconstruction errors between the flawless sample training images and the first reconstructed images.

In one embodiment, the first reconstruction error acquisition module 303 calculates the first latent features by the decoding layers of the autoencoder, and restores the first latent features to obtain the first reconstructed images.

The first probability distribution calculation module 304 inputs the first latent features into a depth learning model and calculates a first probability distribution of the first latent features by the depth learning model.

In one embodiment, the first probability distribution calculation module 304 inputs the first latent features into the deep learning model, and calculates the first latent features by one or more of the convolution layers, pooling layers, and hidden layers in the deep learning model, to obtain the first probability distribution.

The second probability distribution calculation module 305 inputs the first latent features into a Gaussian mixture model and calculates a second probability distribution of the first latent features by the Gaussian mixture model.

In one embodiment, the second probability distribution calculation module 305 inputs the first latent features into the Gaussian mixture model and fits the probability distribution of the first latent features by the Gaussian mixture model to obtain the second probability distribution.

In one embodiment, a formula of the Gaussian mixture model is $G(x_i)=\sum_{i=1}^{K}\alpha_k N(x_i|\mu_k,\sigma_k)$, where $x_i$ is a vector corresponding to the first latent features, t=1, 2, 3 . . . , M, M is a dimension of the first latent features, $\alpha_k$ is a weight of a kth Gaussian distribution, $\alpha_k$ is a mean value of the kth Gaussian distribution, $\sigma_k$ is variance of the kth Gaussian distributions, $N(x_i,\mu_k,\sigma_k)$ is a normal distribution, and k is an integer of more than three.

The divergence calculation module 306 calculates a Kullback-Leible divergence between the first probability distribution and the second probability distribution.

In one embodiment, the divergence calculation module 306 calculates the Kullback-Leible divergence between the first probability distribution and the second probability distribution according to a formula $$D_{KL}(P\|Q) = -\sum_i P(i)\ln\frac{Q(i)}{P(i)},$$

where $DK_L(P\|Q)$ is the Kullback-Leible divergence between the first probability distribution and the second probability distribution, P(i) is the second probability distribution, and Q(i) is the first probability distribution.

The model training module 307 obtains a total loss according to the first reconstruction errors and the Kullback-Leible divergence, optimizes the autoencoder, the depth learning model, and the Gaussian mixture model according to the total loss, and sets a threshold according to the total loss.

In one embodiment, the model training module 307 calculates a product between the first reconstruction errors and the Kurbeck Leibler divergence to obtain the total loss, and optimizes parameters of the autoencoder, of the deep learning model, and of the Gaussian mixture model to minimize the total loss.

In one embodiment, the autoencoder, the deep learning model, and the Gauss mixing model are adjusted to minimize the total loss, with the aim of optimizing the auto encoder, the deep learning model, and the Gauss mixed mode, and making the deep learning model have the same probability distribution as the reconstructed image generated by the Gaussian mixture model according to the autoencoder.

The total error calculation module 308 obtains testing sample images, inputs the testing sample images into the autoencoder, calculates second latent features of the testing sample images by the coding layers of the autoencoder, and inputs the second latent features into the decoding layers of the autoencoder to calculate the second reconstructed images of the testing sample images.

The total error calculation module 308 further uses the preset error function to calculate the second reconstruction errors between the testing sample images and the second reconstruction images, inputs the second latent features into the depth learning model, calculates a third probability distribution of the second latent features, and calculates the total error according to the third probability distribution and the second reconstruction errors.

In one embodiment, the total error calculation module 308 sums the third probability distribution and the second reconstruction errors to obtain the total error.

The determining module 309 determines that the testing sample images show defects when the total error is greater than or equal to the threshold, and determines that the testing sample image show no flaws when the total error is less than the threshold.

In present disclosure, by simultaneously training the autoencoder, the deep learning model, and the Gaussian mixture model, the deep learning model and the Gaussian mixture model can output the same probability distribution prediction, so that the deep learning model can replace the Gaussian mixture model to detect defects, increasing efficiency in defect detection.

Figure 3:
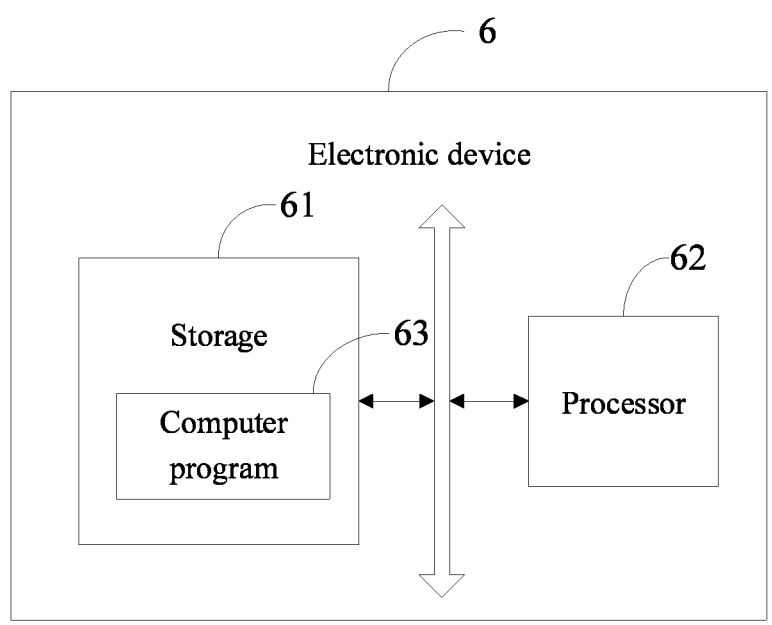
FIG. 3 is a schematic diagram of one embodiment of an electronic device according to the present disclosure, employing the method of FIG. 1.

FIG. 3 illustrates the electronic device 6. The electronic device 6 includes a storage 61, a processor 62, and a computer program 63 stored in the storage 61 and executed by the processor 62. When the processor 62 executes the computer program 63, the blocks in the embodiment of the image defect detection method are implemented, for example, blocks 11 to 20 as shown in FIG. 1. Alternatively, when the processor 62 executes the computer program 63, the functions of the modules in the embodiment of the image defect detection device are implemented, for example, modules 301-309 shown in FIG. 2.

In one embodiment, the computer program 63 can be partitioned into one or more modules/units that are stored in the storage 61 and executed by the processor 62. The one or more modules/units may be a series of computer program instruction segments capable of performing a particular function, and the instruction segments describe the execution of the computer program 63 in the electronic device 6. For example, the computer program 63 can be divided into the image acquisition module 301, the first latent feature acquisition module 302, the first reconstruction error acquisition module 303, the first probability distribution calculation module 304, the second probability distribution calculation module 305, the divergence calculation module 306, the model training module 307, the total error calculation module 308, and the determining module 309 as shown in FIG. 2.

In one embodiment, the electronic device 6 can be a computing device such as a desktop computer, a notebook, a handheld computer, and a cloud terminal device. FIG. 3 shows only one example of the electronic device 6. There are no limitations of the electronic device 6, and other examples may include more or less components than those illustrated, or some components may be combined, or have a different arrangement. The components of the electronic device 6 may also include input devices, output devices, communication units, network access devices, buses, and the like.

The processor 62 can be a central processing unit (CPU), or other general-purpose processor, a digital signal processor (DSP), an application specific integrated circuit (ASIC), Field-Programmable Gate Array (FPGA) or other programmable logic device, discrete gate or transistor logic device, discrete hardware components, etc. The processor 62 may be a microprocessor or the processor may be any conventional processor or the like. The processor 62 is the control center of the electronic device 6, and connects the electronic device 6 by using various interfaces and lines. The storage 61 can be used to store the computer program 63, modules or units, and the processor 62 can realize various functions of the electronic device 6 by running or executing the computer program, modules, or units stored in the storage 61 and calling up the data stored in the storage 61.

In one embodiment, the storage 61 may mainly include a program storage area and a data storage area, wherein the program storage area may store an operating system, an application program (such as a sound playback function, an image playing function, etc.) required for at least one function, etc. The data storage area can store data (such as audio data, telephone book, etc.) created according to the use of electronic device 6. In addition, the storage 61 may include a high-speed random access memory, and may include a non-volatile memory, such as a hard disk, an internal memory, a plug-in hard disk, a smart media card (SMC), a secure digital (SD) card, a flash card, at least one disk storage device, a flash memory device, or other solid state storage device.

In one embodiment, the modules/units integrated in the electronic device 6 can be stored in a computer readable storage medium if such modules/units are implemented in the form of a product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunication signals, and software distribution media.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. An image defect detection method comprising:
obtaining flawless sample training images;
inputting the flawless sample training images into an autoencoder, and calculating first latent features of the flawless sample training images by coding layers of the autoencoder;
inputting the first latent features into decoding layers of the autoencoder, and calculating first reconstructed images of the flawless sample training images by the decoding layers, calculating the flawless sample training images and the first reconstructed images by a preset error function to obtain first reconstruction errors between the flawless sample training images and the first reconstructed images;
inputting the first latent features into a depth learning model and calculating a first probability distribution of the first latent features by the depth learning model;
inputting the first latent features into a Gaussian mixture model and calculating a second probability distribution of the first latent features by the Gaussian mixture model;
calculating a Kullback-Leible divergence between the first probability distribution and the second probability distribution;
obtaining a total loss according to the first reconstruction errors and the Kullback-Leible divergence, optimizing the autoencoder, the depth learning model and the Gaussian mixture model according to the total loss, and setting a threshold according to the total loss;
obtaining testing sample images, inputting the testing sample images into the autoencoder, calculating second latent features of the testing sample images by the coding layers of the autoencoder, inputting the second latent features into the decoding layers of the autoencoder to calculate the second reconstructed images of the testing sample images;
using the preset error function to calculate the second reconstruction errors between the testing sample images and the second reconstruction images, inputting the second latent features into the depth learning model, calculating a third probability distribution of the second latent features, and calculating the total error according to the third probability distribution and the second reconstruction errors; and
when the total error is greater than or equal to the threshold, determining that the testing sample images are defect images, and when the total error is less than the threshold, determining that the testing sample images are flawless images.

2. The image defect detection method as recited in claim 1, further comprising:
vectorizing the flawless sample training images to obtain feature vectors of the flawless sample training images;
calculating the feature vectors of the flawless sample training images by the coding layers of the autoencoder to obtain the first latent features.

3. The image defect detection method as recited in claim 1, further comprising:
calculating the first latent features by the decoding layers of the autoencoder; and restoring the first latent features to obtain the first reconstructed images.

4. The image defect detection method as recited in claim 1, further comprising:
inputting the first latent features into the deep learning model, calculating the first latent features by one or more of the convolution layers, pooling layers and hidden layers in the deep learning model to obtain the first probability distribution.

5. The image defect detection method as recited in claim 1, further comprising:
calculating the Kullback-Leible divergence between the first probability distribution and the second probability distribution according to a formula $$D_{KL}(P\|Q) = -\sum_i P(i)\ln\frac{Q(i)}{P(i)},$$

$D_{KL}(P\|Q)$ is the Kullback-Leible divergence between the first probability distribution and the second probability distribution, P(i) is the second probability distribution, and Q(i) is the first probability distribution.

6. The image defect detection method as recited in claim 1, further comprising:
calculating a product between the first reconstruction errors and the Kurbeck Leibler divergence to obtain the total loss, optimizing parameters of the autoencoder, parameters of the deep learning model and parameters of the Gaussian mixture model to minimize the total loss.

7. The image defect detection method as recited in claim 1, further comprising:
summing the third probability distribution and the second reconstruction errors to obtain the total error.

8. An electronic device comprising:
a processor; and
a non-transitory storage medium coupled to the processor and configured to store a plurality of instructions, which cause the processor to:
obtain flawless sample training images;
input the flawless sample training images into an autoencoder, and calculate first latent features of the flawless sample training images by coding layers of the autoencoder;
input the first latent features into decoding layers of the autoencoder, and calculate first reconstructed images of the flawless sample training images by the decoding layers, calculate the flawless sample training images and the first reconstructed images by a preset error function to obtain first reconstruction errors between the flawless sample training images and the first reconstructed images;
input the first latent features into a depth learning model and calculate a first probability distribution of the first latent features by the depth learning model;
input the first latent features into a Gaussian mixture model and calculate a second probability distribution of the first latent features by the Gaussian mixture model;
calculate a Kullback-Leible divergence between the first probability distribution and the second probability distribution;
obtain a total loss according to the first reconstruction errors and the Kullback-Leible divergence, optimize the autoencoder, the depth learning model and the Gaussian mixture model according to the total loss, and set a threshold according to the total loss;
obtain testing sample images, inputting the testing sample images into the autoencoder, calculate second latent features of the testing sample images by the coding layers of the autoencoder, input the second latent features into the decoding layers of the autoencoder to calculate the second reconstructed images of the testing sample images;
use the preset error function to calculate the second reconstruction errors between the testing sample images and the second reconstruction images, input the second latent features into the depth learning model, calculate a third probability distribution of the second latent features, and calculate the total error according to the third probability distribution and the second reconstruction errors; and
determine that the testing sample images are defect images when the total error is greater than or equal to the threshold, and determine that the testing sample image are flawless images when the total error is less than the threshold.

9. The electronic device as recited in claim 8, wherein the plurality of instructions are further configured to cause the processor to:
vectorize the flawless sample training images to obtain feature vectors of the flawless sample training images;
calculate the feature vectors of the flawless sample training images by the coding layers of the autoencoder to obtain the first latent features.

10. The electronic device as recited in claim 8, wherein the plurality of instructions are further configured to cause the processor to:
calculate the first latent features by the decoding layers of the autoencoder; and
restore the first latent features to obtain the first reconstructed images.

11. The electronic device as recited in claim 8, wherein the plurality of instructions are further configured to cause the processor to:
input the first latent features into the deep learning model, calculate the first latent features by one or more of the convolution layers, pooling layers and hidden layers in the deep learning model to obtain the first probability distribution.

12. The electronic device as recited in claim 8, wherein the plurality of instructions are further configured to cause the processor to:
calculate the Kullback-Leible divergence between the first probability distribution and the second probability distribution according to a formula $$D_{KL}(P\|Q) = -\sum_i P(i)\ln\frac{Q(i)}{P(i)},$$

wherein $D_{KL}(P\|Q)$ is the Kullback-Leible divergence between the first probability distribution and the second probability distribution, P(i) is the second probability distribution, and Q(i) is the first probability distribution.

13. The electronic device as recited in claim 8, wherein the plurality of instructions are further configured to cause the processor to:
calculate a product between the first reconstruction errors and the Kurbeck Leibler divergence to obtain the total loss, optimize parameters of the autoencoder, parameters of the deep learning model and parameters of the Gaussian mixture model to minimize the total loss.

14. The electronic device as recited in claim 8, wherein the plurality of instructions are further configured to cause the processor to:
sum the third probability distribution and the second reconstruction errors to obtain the total error.

15. A non-transitory storage medium having stored thereon instructions that, when executed by at least one processor of an electronic device, causes the least one processor to execute instructions of an image defect detection method, the method comprising:
obtaining flawless sample training images;
inputting the flawless sample training images into an autoencoder, and calculating first latent features of the flawless sample training images by coding layers of the autoencoder;
inputting the first latent features into decoding layers of the autoencoder, and calculating first reconstructed images of the flawless sample training images by the decoding layers, calculating the flawless sample training images and the first reconstructed images by a preset error function to obtain first reconstruction errors between the flawless sample training images and the first reconstructed images;
inputting the first latent features into a depth learning model and calculating a first probability distribution of the first latent features by the depth learning model;
inputting the first latent features into a Gaussian mixture model and calculating a second probability distribution of the first latent features by the Gaussian mixture model;
calculating a Kullback-Leible divergence between the first probability distribution and the second probability distribution;
obtaining a total loss according to the first reconstruction errors and the Kullback-Leible divergence, optimizing the autoencoder, the depth learning model and the Gaussian mixture model according to the total loss, and setting a threshold according to the total loss;
obtaining testing sample images, inputting the testing sample images into the autoencoder, calculating second latent features of the testing sample images by the coding layers of the autoencoder, inputting the second latent features into the decoding layers of the autoencoder to calculate the second reconstructed images of the testing sample images;
using the preset error function to calculate the second reconstruction errors between the testing sample images and the second reconstruction images, inputting the second latent features into the depth learning model, calculating a third probability distribution of the second latent features, and calculating the total error according to the third probability distribution and the second reconstruction errors; and
when the total error is greater than or equal to the threshold, determining that the testing sample images are defect images, and when the total error is less than the threshold, determining that the testing sample image are flawless images.

16. The non-transitory storage medium as recited in claim 15, wherein the image defect detection method comprising:
vectorizing the flawless sample training images to obtain feature vectors of the flawless sample training images;
calculating the feature vectors of the flawless sample training images by the coding layers of the autoencoder to obtain the first latent features.

17. The non-transitory storage medium as recited in claim 15, wherein the image defect detection method comprising:
calculating the first latent features by the decoding layers of the autoencoder; and
restoring the first latent features to obtain the first reconstructed images.

18. The non-transitory storage medium as recited in claim 15, wherein the image defect detection method comprising:
inputting the first latent features into the deep learning model, calculating the first latent features by one or more of the convolution layers, pooling layers and hidden layers in the deep learning model to obtain the first probability distribution.

19. The non-transitory storage medium as recited in claim 15, wherein the image defect detection method comprising:
calculating the Kullback-Leible divergence between the first probability distribution and the second probability distribution according to a formula $$D_{KL}(P\|Q) = -\sum_{i} P(i)\ln\frac{Q(i)}{P(i)},$$

$D_{KL}(P\|Q)$ is the Kullback-Leible divergence between the first probability distribution and the second probability distribution, $P(i)$ is the second probability distribution, and $Q(i)$ is the first probability distribution.

20. The non-transitory storage medium as recited in claim 15, wherein the image defect detection method comprising:
calculating a product between the first reconstruction errors and the Kurbeck Leibler divergence to obtain the total loss, optimizing parameters of the autoencoder, parameters of the deep learning model and parameters of the Gaussian mixture model to minimize the total loss.

* * * * *